United States Patent [19]

Hurst et al.

[11] 3,970,626
[45] July 20, 1976

[54] ETHYLENE INTERPOLYMER COMPOSITIONS AND PROCESS

[75] Inventors: Jack Hurst, Shawnee, Kans.; Harry D. Anspon, Kansas City, Mo.

[73] Assignee: Gulf Oil Corporation, Pittsburgh, Pa.

[22] Filed: Aug. 14, 1961

[21] Appl. No.: 131,108

[52] U.S. Cl. .............. 260/29.6 WB; 260/29.6 TA; 260/29.6 H; 260/29.6 AT; 260/897 B; 428/511; 428/539; 526/89; 526/329
[51] Int. Cl.$^2$ .................................. C08F 210/02
[58] Field of Search ............ 260/29.6 WB, 29.6 TA, 260/29.6 H, 29.6 AT, 897 B, 80.73, 80.8, 86.7

[56] References Cited
UNITED STATES PATENTS

| | | | |
|---|---|---|---|
| 2,953,551 | 9/1960 | White | 260/86.7 |
| 3,436,363 | 4/1969 | Helin | 260/29.6 |
| 3,437,626 | 4/1969 | Glabisch | 260/29.6 |

FOREIGN PATENTS OR APPLICATIONS

| | | | |
|---|---|---|---|
| 836,988 | 10/1938 | France | 260/29.6 EM |
| 678,279 | 9/1952 | United Kingdom | 260/29.6 EM X |
| 813,814 | 5/1959 | United Kingdom | 260/29.6 |

Primary Examiner—Edward J. Smith

[57] ABSTRACT

Alkali metal salts of copolymers of ethylene and acrylic and/or methacrylic acid are provided. The alkali metal salts are prepared by saponifying copolymers of ethylene and an alkyl acrylate or an alkyl methacrylate in the presence of an aqueous solution of an alkali metal hydroxide.

17 Claims, No Drawings

ETHYLENE INTERPOLYMER COMPOSITIONS AND PROCESS

This invention relates to ethylene interpolymers. More particularly it relates to ethylene emulsion interpolymer compositions and related processes.

The application of stable polymeric emulsions to fabricating materials, such as paper, woven fabrics, wood, metal, glass, and the like, has grown to a wide usage. Existing polymeric films can often also be improved in deficient properties by the application of a polymeric emulsion resulting in improved film insofar as one or more of the properties is concerned, e.g., water impermeability. It is contemplated that greater usage yet will be made of any novel and economical polymeric emulsions which are readily reproducible and which have the improved stability and other desired characteristics. Especially desired emulsions do not require the addition of emulsifying agents either during polymerization or by post-addition. Aqueous polymeric emulsions containing no or only minor amounts of emulsifying agents are especially desired since emulsifiers now are a needed and tolerated factor which usually detract from many wanted properties of the coating made from the emulsions. It is believed emulsifying agents diminish coatings and films produced from polymeric emulsions in certain important properties such as by reducing tensile strength, reducing freeze-thaw stability, reducing stability to high heat conditions, and the like.

Accordingly, by this invention are provided water-insoluble ethylene-acrylate interpolymers having from about 0.01 to about 0.5 moles of acrylate groups per mole of contained ethylene groups which interpolymers have the character of being convertible to the physical state of a shelf-stable aqueous emulsion without substantial employment of emulsifying agents, said ethylene-acrylate interpolymers being formable from a thermoplastic ethylene-alkyl acrylate ester interpolymer having from about 0.01 to about 0.5 moles of acrylate groups per mole of contained ethylene groups, said water-insoluble ethylene-acrylate interpolymer having an emulsification-inducing portion of said acrylate groups in a hydrophilic form. "Ethylene group" and "acrylate groups" as used herein are defined as those units of the interpolymers which correspond to the ethylene and acrylate monomers, respectively, which were polymerized in forming the interpolymers.

It has been found that the water-insoluble ethylene-acrylate interpolymers of this invention can be formed from an appropriate thermoplastic interpolymer having groups corresponding to ethylene and an alkyl acrylate such as methyl acrylate by treatment with an excess of caustic such as a one-fold excess so as to bring about hydrolysis of a portion or all of the ester groups to carboxylate groups.

Furthermore, other presently preferred water-insoluble interpolymers provided hereby can be formed by adding to the hydrolyzing caustic (e.g., sodium hydroxide or potassium hydroxide) mixture an amount of a nitrogenous base such as ammonia or an amine. When a portion of ammonia (or an amine) is utilized in the chemical conversion of part of the alkyl acrylate groups, a substantial portion of unchanged alkyl acrylate ester group can be present in the final water-insoluble interpolymers, which are capable of forming shelf-stable aqueous emulsions. Generally speaking, the final interpolymer as provided hereby having from 0.01 to about 0.5 moles of acrylate groups per mole of contained ethylene groups can have, depending upon the various influencing factors (such as total acrylate content, molecular weight, and the like), a distribution of the acrylate forms within the following ranges when ammonia (or an amine) and a caustic (e.g., sodium hydroxide or potassium hydroxide) are both used to convert all or a portion of the alkyl acrylate ester groups of an ethylene-alkyl acrylate interpolymer: from zero to about ninety percent in alkyl acrylate ester form, from about one to about ninety percent of the acrylate groups being present in amide form (desirably from about five to about seventy), and from about ten to about ninety-nine percent of the acrylate groups being present in carboxylate salt form (desirably from about twenty to about eighty percent), on a molar basis.

The above interpolymers can be provided for use in a number of different physical forms included within the scope of this invention. Such forms include dry solid forms, wetted, paste-like forms, aqueous emulsion forms redied for final end-use application, and others.

The aqueous emulsion form encompasses another preferred aspect of this invention which can be defined as shelfstable aqueous polymeric emulsions in which the polymer of the emulsion is a water-insoluble, ethylene-acrylate interpolymer having from about 0.01 to about 0.5 moles of acrylate groups per mole of contained ethylene groups, said interpolymer emulsion being formable without substantial employment of emulsifying agents from a thermoplastic ethylene-alkyl acrylate ester interpolymer having from about 0.01 to about 0.5 moles of acrylate groups per mole of contained ethylene groups, said water-insoluble ethylene-acrylate interpolymer having an emulsifying-inducing portion of said alkyl ester groups in a hydrophilic form. Of course, the shelf-stable aqueous polymeric emulsions are included wherein the polymers of the emulsion are species of the interpolymers described hereinabove, as well as other interpolymer species embraced by this invention.

The water-insoluble interpolymers hereby provided can have the previously referred to range of from about 0.01 to about 0.5 moles of acrylate groups per mole of contained ethylene groups. However, usually the interpolymers desirably have from about 0.025 to about 0.25 moles of acrylate groups and generally speaking have preferably from about 0.05 to 0.15 mole parts of acrylate groups per mole of groups of contained ethylene.

The interpolymers of this invention can be and preferably are readily provided by starting with an ethylene-alkyl acrylate interpolymer, preferably starting with an ethylene-alkyl acrylate interpolymer being of a highly uniform character inasmuch as the alkyl acrylate groups are evenly distributed throughout the polymeric chains. Highly suitable acrylate interpolymers for use in this invention are the ethylene-alkyl acrylate copolymers in which the alkyl acrylate can be an alkyl ester of unsubstituted acrylic acid or a simple alpha-substituted acrylic acid, such as methacrylic acid. Such interpolymers are described by George E. Ham, Harry D. Anspon, and William H. Byler in copending application Ser. No. 50,882, filed Aug. 22, 1960, and now abandoned. In the presently preferred starting interpolymers, the ethylenelower alkyl acrylate interpolymers are preferred, especially those of the lower alkyl acrylate ester of unsubstituted acrylic and such as methyl acrylate.

The description herein set forth is specifically directed to ethylene-acrylate interpolymers. However, it is to be understood that the main chain of these interpolymers is a polyethylene chain. Moreover, the interpolymers can be viewed generally speaking as a polyethylene with the portion of the original acrylate comonomer molecule existing unincorporated in the main polyethylene chain as side chains or groups of the interpolymers. Thus, in reference to ethylene-methyl acrylate interpolymers, as an illustration, the side chains have the structure

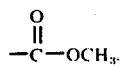

Then, in the description of this invention, ethylene-acrylate interpolymers means those interpolymers having such a main chain with side chains as described herein or their equivalents, from which aqueous emulsions coming within the scope and spirit of this invention can be derived.

It will be suggested to those skilled in the emulsion art with the benefit of this disclosure that other chemical alterations can be made in a thermoplastic ethylene-alkyl acrylate interpolymer which will provide other hydrophilic forms resulting in useful emulsions. The suggested alternate forms of the acrylate groups derivable from starting ethylene-alkyl acrylate interpolymers are generally described by the following equation:

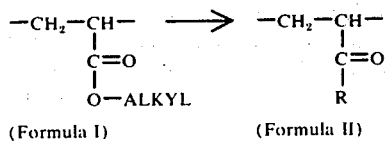

wherein the formula "I" is the acrylate group of the polymer and formula "II" represents alternative hydrophilic acrylate forms. In Formula II, R can have any of the chemical structures set forth in the next seven formulae. The following is in illustration of reactions to provide the alternative forms: A starting thermoplastic ethylene-alkyl acrylate interpolymer is reacted with (a) an amino aliphatic carboxylic acid such as glycine to provide for example the sodium acrylate salt form

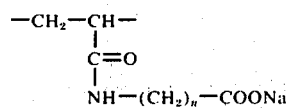

in which n is a small integer; (b) an aminosulfonic acid such as p-aminobenzene sulfonic acid to provide hydrophilic groups illustrated as

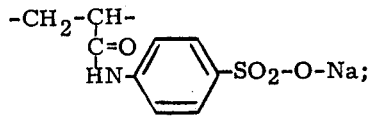

(c) an unsaturated aliphatic amine or alcohol such as allyl amine or allyl alcohol to provide an interpolymer having allylsubstituted acrylate groups which in turn can be altered as by an addition reaction to provide acrylate forms illustrated by the sulfate forms

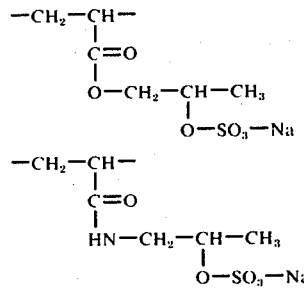

(d) an alkyl diamine such as ethylene diamine to provide an interpolymer having aminoalkyl-substituted amide acrylate forms illustrated by

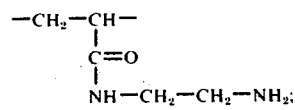

(e) a suitable polyether formed as by ethylene oxide condensation which has hydroxyl groups available for an ester exchange reaction to form acrylate forms illustrated by

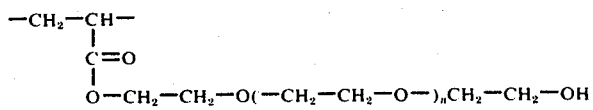

wherein "n" is an integer of suitable size such as provided by presently marketed nonionic emulsifier products [this acrylate form can be treated to provide another type hydrophilic form illustrated by

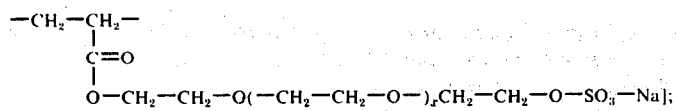

and others.

In another aspect of this invention, processes are provided as generally mentioned above whereby stable aqueous emulsions are produced by heating a mixture of water and a thermoplastic ethylene-alkyl acrylate interpolymer with an agent capable of converting an emulsion-inducing portion of the alkyl acrylate ester groups to a hydrophilic form. A presently preferred agent for such conversion is an alkali metal hydroxide, desirably sodium hydroxide or potassium hydroxide. To the polymeric reaction mixture can be added a quantity of ammonia or an amine.

In the emulsion formation, it has been found suitable to heat the ethylene-alkyl acrylate in a pressure reactor to prevent undue loss of the liquid medium, in the presence of sodium hydroxide at an elevated temperature sufficiently high to hydrolyze the ester groups to sodium carboxylate groups. It has been found suitable to employ an excess of sodium hydroxide over what is theoretically required to convert the desired mole of ester groups. It has been experienced that a one-fold excess functions efficiently in the hydrolysis if about a five or less to about a twenty-hour reaction period is employed and a temperature in the range of about 180°C to about 300°C is used (preferably about 200°C to about 250°C when using preferred starting interpolymers, e.g., ethylene-methyl acrylate interpolymers). However, at times a lesser period of time will suffice and in other reactions a greater period of time will be necessary. Particularly will greater periods of time be required occasionally when the acrylate groups of the copolymers are esters of alphasubstituted acrylic acids such as methacrylic acid. Also, at times somewhat more stringent conditions such as greater reaction times and higher temperatures can be used to advantage when in the copolymer formation the esters employed are derived from unsubstituted acrylic acids but the higher alkyl groups contribute the alkyl portion. The upper limit of the temperatures is governed by the decomposition point of the polymers as well as any interference with the formation and stability of the groups desired in the end polymers of the emulsions.

If ammonia or an amine is employed, about the same temperature and reaction periods can generally be employed. The relative quantities of ammonia (or amine) and hydroxide employed will vary depending upon the nature of the ammonia (or amine), reaction conditions, relative amounts of the acrylate forms desired, and other factors. Customarily, it has been found that when, for example, a starting ethylene-acrylate copolymer is used having a preferred acrylate content, about ten to fifteen liters of a commercial concentrated ammonium hydroxide (ca. 15N.) per kilogram of interpolymer can be satisfactorily employed.

Although the processes and emulsions of this invention are described with particular reference to the employment of ammonia as the nitrogenous base and alkali metal hydroxides as the base in order to bring about the desired emulsions, it is to be understood that amines can be used in part or completely to replace ammonia if their use will result in the stable emulsions of this invention. To illustrate, the use of the amine, ethanolamine, has been found to result in satisfactory emulsions. Likewise, other bases than the alkali metal hydroxides can be employed to form the carboxylate salt groups of polymers of the aqueous emulsions provided hereby whenever such other base will permit the formation of the desired stability of the emulsions.

As discussed above, certain other agents capable of converting the acrylate ester groups to provide an emulsificationinducing amount of a hydrophilic acrylate form can be substituted for the metallic hydroxide agents in providing the necessary groups as discussed above.

In actual practice, according to the processes provided by this invention employing the preferred simple expedient of employing sodium hydroxide, the solid ethylene-acrylate interpolymer is added to a pressure reactor. The polymer can be added in ground form but can very satisfactorily be added as cubes or pellets of the size such as is conventional in marketed solid polyethylene. The required ratios of the polymer, the nitrogenous base (if employed), and the base are added to the pressure reactor. It should be borne in mind that the pressure reactor is employed in order to prevent escape of the liquid emulsion medium of the reaction mixture, but does not, it is believed, serve other imperative requirements. Thus, a pressure reactor should be selected which is of suitable size for the quantity of aqueous emulsion to be made. It is desired that the reactor be equipped with means to agitate the reaction mixture such as by rocking or internal stirring and for controlling the reaction heat of the emulsifying mixture.

Generally, the emulsions prepared according to the above described processes have a uniformly small particle size as desired and do not for most end uses require filtration. However, at times some unwanted larger particles might be present. In this event, they can be removed by filtration following standard techniques employed in conjunction with polymeric latex preparations, or by centrifugation.

The emulsions provided by this invention in general exhibit a high degree of stability and have a unique combination of desired properties. The following are some of the characteristics of the emulsions: The preferred emulsions provided by this invention are shelf-stable inasmuch as they give no appearance of significant change after 48 hours standing and customarily even after 30 days storage in conventional glass containers at ambient room temperatures. This stability is customarily exhibited without employment of added emulsifying agents. However, suitable conventional emulsifying agents can be added if desired without disrupting the emulsion state of the compositions. The emulsifying agents have been found particularly useful when admixing the emulsions provided by this invention with polymeric emulsions requiring emulsifying agents for stability. The emulsions customarily show unusual stability to temperature extremes, viz., they show freeze-thaw stability and stability to relatively high temperatures such as ordinary boiling water temperatures and higher.

In general, the polymers provided by this invention can be extruded and can be molded or readily formed into film, showing good flexibility.

As indicated hereinabove, the emulsions, although showing a very high degree of shelf-stability, are frequently sensitive to the addition of strong mineral acids which will bring about a final pH of the emulsions below the pK'a of the carboxylate groups. Likewise, the presence of multivalent metallic ions have at times been found to be incompatible with the emulsion state of the compositions, such as cupric, ferric, calcium, and the like ions.

The interpolymer of the emulsions can be coagulated readily as a general rule by addition of an electrolyte such as sodium chloride or by the addition of strong mineral acids. However, surprisingly, the coagulum can ordinarily be reconstituted to the emulsion state after thorough water washing followed as by appropriate heat treatment with an amount of caustic or ammonia, or both.

The polymers of the aqueous emulsions provided hereby are advantageously in general characterized by having quite high relative molecular weights. The polymers of the emulsions can easily be enhanced or diminished in molecular weights by producing starting ethylene-alkyl acrylate interpolymers in, e.g., continuous autoclave reactors which entail processes permitting great variety in the polymer as to molecule weight. This relatively high molecular weight easily attained hereby contributes most significantly to the strength of final coatings or films derived from the emulsions.

The emulsions generally exhibit a high degree of mechanical stability as measured conventionally by exposure to agitation in a Waring blender for at least one minute at its common rotational speed of about 17,000 revolutions per minute. Many of the emulsions show excellent mechanical stability for much longer exposure periods.

The particles of polymer of the emulsions usually are of surprisingly low particle size, generally of a low micron range. In the preferred emulsions, the great majority of the particles fall in the diameter range of 0.1 or below to about one micron. The particle size can be readily determined by filtration through filters conventional for emulsions particle size determination or by electron microscopy.

Various water-miscible solvents can be added to the emulsions without destruction of the emulsions. For example, it has been found that lower alkanols miscible with water can be added to the end emulsions, for example such lower alkanols as methanol, ethanol, and isopropanol. It has been found that the solvents, for example, the lower alkanols above named, can be added in relatively high quantity such as up to about an equal volume or greater without disturbing the emulsion. It has been found that the higher quantity of solvent often causes a thickening or increase of viscosity of the emulsions which may or may not be a desired characteristic depending upon the intended end use of the emulsions. Solvent compatibility is a highly desired characteristic since it permits the coating of hydrophobic substances such as pre-existing polymeric surfaces, for example, preexisting polyethylene surfaces as film or otherwise. Also, this is an advantageous property since the organic solvent containing emulsions lend themselves to feasible, cast-film manufacture. The cast films frequently exhibit a high ultimate tensile value (frequently at least about 2000 psi)—equivalent to high molecular weight polyethylene films. However, they exhibit an excellent low elongation value, frequently not greater than about two hundred and fifty percent in contrast to values of four hundred to six hundred percent common to polyethylene films.

The emulsions have desired solid contents. For example, emulsions can be readily formed that have about ten to about forty or higher percent solid content which permit a wide usage.

The emulsions can also be employed in addition to the above mentioned uses, as an ingredient in paints, paper treating compositions, polishes, and the like. As to paints, they can be formed from the aqueous emulsions of the invention by adding thereto the required pigments, thickener, and other agents. The additional of a quantity of a formalin solution or other crosslinking agents to the paint compositions containing emulsions of this invention in which, e.g., the polymers have unsubstituted amide groups, has been found to provide certain improvements in the resulting coatings, such as increased hardness.

Coated paper resulting from one or more applications of the emulsions following conventional coating techniques show good low moisture vapor transmission values as measured by conventional tests. Surprisingly, the coating of the paper exhibits a high resistance to creasing without great loss of resistance to water transmission.

The emulsions have shown highly interesting potential utility in the treatment of fabrics. They have shown a high ability to bind pigments to the cloth, good retention on water washing and on dry cleaning the treated cloths, and other desired properties.

The following examples are in further illustration of the compounds and processes of this invention but are not in limitation thereof except as defined by the appended claims.

EXAMPLE 1

A quantity of 150 g. of a uniform ethylene-methyl acrylate interpolymer (this as well as other "uniform" starting interpolymers employed in the Examples are provided by the procedures described by Ham et al, mentioned above) containing 24.8 percent by weight of methyl acrylate groups as determined by infrared analysis, 6 g. of sodium hydroxide pellets, and 1.8 liters of concentrated ammonium hydroxide (ca. 28 percent by weight of ammonia) are added to a one-gallon Magne-Dash autoclave reactor. The starting interpolymer has a melt index of 1.72 and a density at 25° C. of 0.9365 g./cc. The mixture is heated to about 200° C. for sixteen hours, during which time the reaction mixture undergoes vigorous agitation. On cooling, the reaction product is removed and is filtered through a wool felt filter of 1/16 in. thickness. The filtered product is a white emulsion having a polymeric solids content of about 9.3 percent by weight.

A cast film is made of the emulsion employing a casting temperature of 80°–90° C. The cast film has excellent gloss and clarity properties. The film has a thickness of about 1 mil. The cast film shows the excellent tensile strength of about 2000 lbs./sq.in.

A sample of the cast film on nitrogen analysis shows 50.2 percent of the original ester groups are converted to amide groups and essentially all of the remainder of the groups are converted to sodium carboxylate groups. The infrared analysis shows virtual absence of alkyl ester groups.

To demonstrate that water can be stripped off the emulsion to provide a more concentrated emulsion, an aliquot of the emulsion is evaporated to remove water by heating the emulsion under reduced pressure in a rotating flask. The concentrated emulsion contained 36.6 percent by weight of polymer solids. The particle size of the concentrated emulsion polymer particles on electron microscopic inspection revealed again an average particle size diameter less than 0.1 microns with a great number of the particles being of much smaller size than the 0.1 micron range.

Various quantities of methanol, ethanol, and isopropanol, respectively, are blended with separate aliquots of the emulsion. The solvents in even equal volume portions did not disturb the emulsions. At the higher volume additions of solvents, an increase in viscosities of the blends result but no coagulations are noted. This is an important property of the emulsions since it permits ready casting of a film coating on hydrophobic substances such as polyethylene film.

At a concentration of 20 percent by weight of solids, the emulsion remained stable after one minute of agitation in a Waring blender. It showed instability to addition of dilute mineral acid such as hydrochloric acid, divalent salts, and alkaline earth metal hydroxides.

At a polymer concentration of 15 percent by weight, the emulsion surprisingly retained its stability to five cycles of freezing and thawing.

EXAMPLE 2

A quantity of 20 lbs. of a uniform ethylene-methyl acrylate interpolymer containing 20 percent by weight of acrylate groups as determined by infrared analysis, 90 lbs. of water, 0.64 lbs. of sodium hydroxide pellets, and 27 lbs. of liquid ammonia (containing about 28 percent by weight of ammonia) are added to a 20-gallon autoclave reactor. The starting interpolymer has a density of 0.9421 g./cc at 25° C. and a melt index of 1.75. The reaction mixture is heated at 210°–217° C. for about fifteen hours with vigorous agitation.

On cooling the reaction mixture, the product is removed and filtered. The filtered emulsion contains 7.2 percent of polymer solids. The emulsion is stable to agitation in a Waring blender for thirty minutes without any noticeable change in the emulsion. The emulsion is stable to dilution of a 5 ml. quantity of the emulsion to 1000 ml.

EXAMPLE 3

A mixture of 3 g. of a uniform ethylene-methyl acrylate interpolymer containing about 20 percent methyl acrylate groups by weight as determined by infrared analysis, 25 g. of water, 0.1 g. of sodium hydroxide pellets, and 20 g. of ethanolamine are heated in a reactor having a diameter of three-fourth inch and a length of about twelve inches. The starting interpolymer has a density of 0.9421 g./cc. at 25° C. and a melt index of 1.75, as determined by following ASTM procedures. During the reaction, the reactor is agitated to insure a thorough mixing of the reaction mixture. The temperature is maintained at about 230° C. for 16 hours. The reaction product is a free-flowing emulsion. It was filtered through a commercial wool felt having a thickness of about 1/16 inch.

The polymer of the emulsion provided can be coagulated by adding to the polymeric emulsion a quantity of a saturated aqueous sodium chloride solution to bring about the precipitation. The precipitated polymer having both ethanol amide and carboxylate groups can be removed as by filtration, is washed, and is dried to provide a white polymeric product which has a very low melt index and which can be compression molded to provide a tough, flexible film having a low elongation value.

The solid polymeric product after thorough washing can be reconstituted to a stable emulsion form by the addition of a small quantity of sodium hydroxide or ammonium hydroxide and the necessary quantity of distilled water. The mixture is then heated to provide again a shelf-stable emulsion.

EXAMPLE 4

The procedure of Example 3 is repeated using 20 g. of ethoxyethanol amine instead of ethanolamine to provide a shelf-stable, free-flowing emulsion of the polymer. The polymer of the emulsion contains ethoxyethanol amide groups and sodium carboxylate groups.

EXAMPLE 5

The procedure of Example 3 is repeated employing 20 g. of aniline instead of ethanolamine to provide a shelf-stable emulsion in which the polymer of the emulsion has anilide groups as well as sodium carboxylate groups.

EXAMPLE 6

The procedure of Example 3 is repeated employing 30 ml. of an aqueous 40 percent dimethyl amine solution instead of water and the 20 g. of ethanolamine. The reaction product is a shelf-stable polymeric emulsion in which the polymeric particles are less than 0.1 micron in average diameter.

EXAMPLE 7

A mixture of four g. of a uniform ethylene-methyl acrylate interpolymer having a melt index of 1.75 and containing 20 percent by weight of methyl acrylate groups as determined by infrared analysis 27 ml. of water, and 0.74 g. of sodium hydroxide pellets are heated at 227° C. for 16 hours. The starting interpolymer has a density of 0.9421 g./cc. at 25° C. The reactor is cooled and the reaction product is removed. The reaction product is a shelf-stable emulsion having a very small particle size and having a 15 percent concentration of polymer solids. The concentration of solids in the emulsion can be increased as by stripping off a portion of the water.

EXAMPLE 8

A mixture of 10 g. of a uniform ethylene-methyl acrylate interpolymer containing 15 percent by weight of methyl acrylate groups as determined by infrared analysis, 0.2 g. of sodium hydroxide pellets, and 55 ml. of concentrated aqueous ammonium hydroxide (a commercial product containing about 28 percent by weight of ammonia is employed as in the other examples) is heated at 230° C. for about 6 hours in a mechanically agitated stainless steel reactor. The reactor is cooled and the reaction product is removed. The product is a uniform shelf-stable polymeric emulsion having about 6.8 percent solids. The emulsion is filtered through a wool felt filter. The polymer of the emulsion can be readily precipitated or coagulated as by adding a strong aqueous sodium chloride solution such as a saturated solution in order to bring about the precipitation.

EXAMPLE 9

A mixture of 13 g. of the uniform ethylene-methyl acrylate interpolymer containing 24.8 percent of methyl acrylate groups by weight as determined by infrared analysis, 50 ml. of concentrated ammonium hydroxide, and about 0.52 g. of sodium hydroxide pellets is heated for 16 hours at about 230° C. in a 135 ml. mechanically agitated stainless steel reactor. The reactor is cooled and the reaction product consisting of a shelf-stable polymeric emulsion having very small polymeric particle size and a solid polymer concentration of 21.9 percent is removed.

EXAMPLE 10

A mixture of five g. of a solid ethylene-ethyl acrylate interpolymer containing 20 percent by weight of ethyl acrylate groups as determined by infrared analysis, 0.16 g. of sodium hydroxide pellets, and 55 ml. of concentrated aqueous ammonium hydroxide is added to a stainless steel autoclave and heated at 240° C. for about 16 hours. The reactor is cooled and the reaction product consisting of a shelf-stable, white emulsion is removed. The emulsion product is filtered through a 1/16 in. wool felt pad.

EXAMPLE 11

A mixture of 5 g. of the uniform ethylene-methyl acrylate interpolymer employed in Example 9 above, 0.29 g. of potassium hydroxide, and 55 ml. of concentrated aqueous ammonium hydroxide is heated to 230° C. for 16 hours in a mechanically-agitated 135 ml. stainless steel autoclave. The reactor is then cooled and the reaction product is removed and is filtered through a wool felt pad to provide a filtrate consisting of a white, shelf-stable emulsion product. The emulsion has a concentration of 9.1 percent by weight of polymeric solids.

A cast film produced of the filtered emulsion product on infrared analysis shows that about sixty percent of the starting acrylate ester groups are converted to the amide form and essentially all the remainder of the acrylate groups are in the form of potassium carboxylate groups.

EXAMPLE 12

A mixture of 10.4 g. of a uniform ethylene-methyl methacrylate interpolymer containing 15 percent by weight of methyl methacrylate groups as determined by infrared analysis, 0.2 g. of sodium hydroxide pellets, and 60 ml. of concentrated aqueous ammonium hydroxide is heated at 275° C. for about 16 hours in a rocked, stainless steel autoclave. The product is removed on cooling and is filtered. The filtered product is a white polymeric emulsion of rather low concentration of polymer.

EXAMPLE 13

A mixture of five g. of a uniform ethylene-methyl acrylate interpolymer containing 21.1 percent by weight of methyl acrylate groups as determined by infrared analysis, 0.17 g. of sodium hydroxide pellets, and 66.0 ml. of concentrated aqueous ammonium hydroxide is added to a 135 ml. stainless steel reactor and the mixture is heated for 16 hours at 200° C. On cooling, the reaction product is removed and is filtered through wool felt to provide a white, shelf-stable polymeric emulsion.

EXAMPLE 14

A mixture of five g. of the uniform ethylene methyl acrylate interpolymer employed in Example 9 above, 0.2 g. of sodium hydroxide pellets, 27.8 ml. of concentrated aqueous ammonium hydroxide, and 17.5 ml. of water is heated in a 135-ml. agitated autoclave reactor to 220° C. for 15 hours. On cooling, the product is removed from the reactor and is filtered through wool felt. The filtered, white polymeric product contains 11.6 percent of polymer solids by weight. A cast film by infrared analysis shows about 35 percent of the original acrylate ester groups to be converted to sodium carboxylate groups and the remainder of the acrylate groups essentially all converted to amide groups.

EXAMPLE 15

The procedure of Example 14 is repeated employing 0.1 g. of sodium hydroxide pellets and 55 ml. of ammonium hydroxide instead of the quantities employed in Example 11. The filtered emulsion product contains 9.6 percent of polymeric solids. The emulsion can be increased in solids content by stripping off a portion of the water.

EXAMPLE 16

A quantity of 100 g. of the uniform ethylene methyl acrylate interpolymer employed in Example 9 is heated with 300 ml. of a 20 percent aqueous sodium hydroxide solution at 200° C. for four hours. On cooling the reactor, the reaction product is removed and filtered. The solid polymeric product removed consists of the interpolymer wherein the acrylate groups are in sodium carboxylate form. The solid polymer is washed and is dried. The infrared analysis of the dried product showed that essentially all of the acrylate ester groups are converted to sodium carboxylate groups.

To a quantity of five g. of the solid interpolymer in which the acrylate groups are in sodium carboxylate form is added 50 ml. of concentrated ammonium hydroxide. The mixture is heated for 16 hours at 230° C. in an autoclave reactor.

A shelf-stable polymeric product is obtained which is typical of those provided in the other above examples. On infrared analysis, it is shown that a portion of the carboxylate groups are converted to amide groups. A cast film prepared from the emulsion showed excellent gloss and clarity properties.

EXAMPLE 17

An emulsion prepared by the procedure of Example 9 is applied to a horizontally disposed bread wrapper stock paper on the side that is coated in the conventional manner with titanium dioxide and acrylic binder. A horizontal bar is pulled over the bread wrapper paper stock pushing the excess emulsion before it thereby leaving an even coating of the emulsion of the paper. The coated paper is heated to 105° to 110° C. for five minutes and cooled. The treated paper is evaluated in respect to moisture vapor transmission using Thwing-Albert gravimetric water vapor permeability cups. In the test, a relative humidity of 80 percent at 175° F. is employed in a constant humidity chamber. In the cups is placed a quantity of a dessicant (anhydrous magnesium perchlorate) to bring about a near zero humidity within the cup thereby inducing water to be transmitted from the inside of the chamber through the film and into the cup. The cup is weighed at the end of the determination and the quantity of moisture vapor transmitted is expressed in terms of g./sq.meters/24 hr./1 mil of film thickness, both on the basis of flat and creased film. The coated papers showed desired very low moisture vapor transmission values of about 20 or less g./sq.m/24 hr./1 mil thickness, depending upon the particular thickness of the film, both before creasing and after creasing. It is quite surprising to note that such low moisture vapor transmission values are even obtained after creasing the coated paper.

What is claimed is:

1. Ethylene copolymers selected from the group consisting of:
   1. Polymers containing 67–99 mol % of units (a) and, correspondingly, 33–1 mol % of units (b),
   2. Polymers containing 67–99 mol % of units (a) and, correspondingly, 33–1 mol % of a mixture of units (b) and (d), and
   3. Mixtures of (1) and (2):
      Said units (a) having the structure —CH$_2$—CH$_2$—,
      Said units (b) having the structure

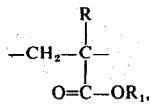

and said units (d) having the structure

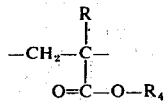

where R is selected from the group consisting of hydrogen and a methyl group, R$_1$ is an alkali metal cation, and R$_4$ is an alkyl group, said ethylene polymers being further characterized in:
   (i) having the units (a), (b) and (d) substantially uniformly distributed throughout the polymer chains, and
   (ii) being sufficiently thermoplastic that they can be extruded and molded.

2. A shelf-stable aqueous emulsion of an ethylene copolymer of claim 1, the polymer solids of said emulsion being maintained in a suspended, dispersed state by the hydrophilic group present in their structure.

3. A process for preparing the aqueous copolymer emulsions of claim 22 which comprises suspending a particulate ethylene-acrylate ester interpolymer in water having an alkali dissolved therein and heating said mixture to a temperature of at least 180°C. under autogenous pressure for a period of time sufficient to enable the alkali to react with a sufficient portion of the ester groups of the ethylene-acrylate ester interpolymer to render said interpolymer self-emulsifiable in the aqueous alkaline medium, said ethylene-acrylate ester interpolymer having polymerized therein 67–99 mol % of ethylene and, correspondingly, 33–1 mol % of a monomer of the group consisting of alkyl esters of acrylic acid and alkyl esters of methacrylic acid; said alkali being selected from the group consisting of alkali metal hydroxides.

4. A film of a copolymer of claim 1.

5. Ethylene copolymers selected from the group consisting of:
   1. Polymers containing 80–97.6 mol % of units (a) and, correspondingly, 20–2.4 mol % of units (b),
   2. Polymers containing 80–97.6 mol % of units (a) and, correspondingly, 20–2.4 mol % of a mixture of units (b) and (d), and
   3. Mixtures of (1) and (2):
      Said units (a) having the structure —CH$_2$—CH$_2$—,
      Said units (b) having the structure

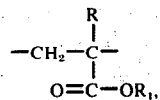

and said units (d) having the structure

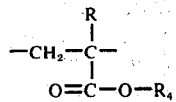

where R is selected from the group consisting of hydrogen and a methyl group, R$_1$ is an alkali metal cation, and R$_4$ is an alkyl group, said ethylene polymers being further characterized in:
   (i) having the units (a), (b) and (d) substantially uniformly distributed throughout the polymer chains, and
   (ii) being sufficiently thermoplastic that they can be extruded and molded.

6. A shelf-stable aqueous emulsion of an ethylene copolymer of claim 5, the polymer solids of said emulsion being maintained in a suspended, dispersed state by the hydrophilic groups present in their structure.

7. Ethylene copolymers selected from the group consisting of:
   1. Polymers containing 87–95.2 mol % of units (a) and, correspondingly, 13.0–4.8 mol % of units (b),
   2. Polymers containing 87–95.2 mol % of units (a) and, correspondingly, 13.0–4.8 mol % of a mixture of units (b) and (d), and
   3. Mixtures of (1) and (2):
      Said units (a) having the structure —CH$_2$—CH$_2$—,
      Said units (b) having the structure

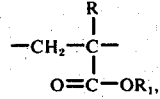

and said units (d) having the structure

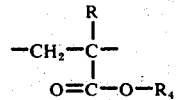

where R is selected from the group consisting of hydrogen and a methyl group, R$_1$ is an alkali metal cation, and R$_4$ is an alkyl group, said ethylene polymers being further characterized in:

i. having the units (a), (b) and (d) substantially uniformly distributed throughout the polymer chains, and
ii. being sufficiently thermoplastic that they can be extruded and molded.

8. Ethylene copolymers containing 67–99 mol % of units (a) and, correspondingly, 33–1 mol % of units (b);

Said units (a) having the structure $-CH_2-CH_2-$, and said units (b) having the structure

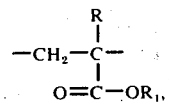

where R is selected from the group consisting of hydrogen and a methyl group and $R_1$ is an alkali metal cation, said ethylene polymers being further characterized in:
i. having the units (a) and (b) substantially uniformly distributed throughout the polymer chains, and
ii. being sufficiently thermoplastic that they can be extruded and molded.

9. Ethylene copolymers containing 67–99 mol % of units (a) and, correspondingly, 33–1 mol % of a mixture of units (b) and (d);

Said units (a) having the structure $-CH_2-CH_2-$,
Said units (b) having the structure

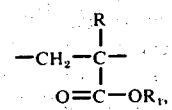

and said units (d) having the structure

where R is selected from the group consisting of hydrogen and a methyl group, $R_1$ is an alkali metal cation, and $R_4$ is an alkyl group, said ethylene polymers being further characterized in:
i. having the units (a), (b) and (d) substantially uniformly distributed throughout the polymer chains, and
ii. being sufficiently thermoplastic that they can be extruded and molded.

10. The alkaline hydroxide saponification product of an ethylene-alkyl acrylate copolymer wherein said saponification product is terpolymeric and comprises a predominant amount of combined ethylene and up to 30 weight percent alkyl acrylate, said alkyl group containing from 1 to 12 carbon atoms, inclusive.

11. The alkaline hydroxide saponification product of claim 10 wherein the alkaline hydroxide is potassium hydroxide.

12. The alkaline hydroxide saponification product of claim 10 wherein the alkyl acrylate is ethyl acrylate.

13. The alkaline hydroxide saponification product of claim 10 wherein the alkyl acrylate is n-butyl acrylate.

14. The alkaline hydroxide saponification product of claim 10 wherein the alkyl acrylate is 2-ethyl-hexyl acrylate.

15. The alkaline hydroxide saponification product of claim 10 wherein the ethylene/alkyl acrylate copolymer contains combined ethylene and alkyl acrylate in a mole ratio of from 97.6:2.4 to 80:20.

16. The alkaline hydroxide saponification product of an ethylene-alkyl acrylate copolymer wherein said saponification product is terpolymeric, comprises a predominant amount of combined ethylene, and up to about 30 weight percent alkyl acrylate, said alkyl group containing from 1 to 8 carbon atoms inclusive.

17. The alkaline hydroxide saponification product of claim 16 wherein the alkyl acrylate is ethyl acrylate.

* * * * *